Patented June 6, 1950

2,510,755

UNITED STATES PATENT OFFICE 2,510,755

PURIFICATION OF ABIETIC ACID

Arthur Pollak and Henry P. Johnston, Charleston, S. C., assignors to West Virginia Pulp and Paper Company, New York, N. Y., a corporation of Delaware No Drawing. Application December 19, 1946, Serial No. 717,310

3 Claims. (Cl. 260—97.6)

Our present invention relates to purifying abietic acid, more particularly abietic acid recovered from tall oil.

Depending on its source, tall oil contains from 35 to 65% rosin acids, 25 to 60% fatty acids and 5 to 30% unsaponifiables. Tall oil is recovered in the first instance in the form of crude skimmings from "black liquor," which is waste liquor obtained from the pulping of wood by the soda or sulfate method. When this liquor is concentrated sufficiently, the tall oil skimmings separate out and are skimmed off. The skimmings are then acidified, with the production of the whole tall oil containing the abietic acid and other rosin and fatty acids in admixture. Abietic acid is normally produced from tall oil by causing it to crystallize therefrom. Such crystallization is promoted when the whole tall oil has been refined in any manner, as by distillation, purification with adsorbents, etc.

When, however, abietic acid crystallizes from its previous solution in tall oil, some of the latter unavoidably adheres to the crystals as mother liquor, thereby necessitating a further purification step.

It is with the removal of adhering mother liquor from the abietic acid crystals that the present invention is concerned.

It is our observation that raising the temperature of the mixture of crystals and mother liquor permits a cleaner separation thereof, but this increased efficiency of separation is offset by the fact that at the higher temperatures the abietic acid is more soluble in the mother liquor, whereby the yield at the higher temperatures is substantially less. Conversely at lower temperatures a greater yield of crystals results with greater amounts of adhering mother liquor due to its greater viscosity at the lower temperatures.

We have now discovered that treatment of the crystals with a solution of a mild alkali, as for example an alkali metal carbonate, is effective in removing the adhering liquid phase acids to a considerable degree with only slight loss of the crystalline abietic acid.

The solution of the liquid phase acids extracted with the mild alkali may be recovered as by acidulating the extract and separating the oil phase.

We have further discovered that the effectiveness of such treatment is enhanced by the subsequent treatment of the purified crystals with steam or hot water spray, preferably in the revolving centrifuge, the action of the condensing steam or hot water serving to remove residual alkaline solution or salt as well as traces of mother liquor which may still be left. Thus the steam or hot water not only washes the crystals but also greatly reduces the viscosity of the adhering soap solution and enables it to be removed by centrifugal action.

The following specific examples will illustrate the invention and its preferred mode of execution:

Example I 100 pounds of abietic acid as obtained from the crystallization of tall oil was thoroughly mingled with 100 gals. of water having dissolved therein 4 lbs. sodium carbonate, this mixture being rapidly stirred for one hour, after which it was filtered through a cloth filter using suction. The abietic acid retained in the filter was then mixed with 100 gals. of water, stirred for 15 minutes and again filtered and washed until the soap was substantially all removed.

Example II 100 lbs. of crystalline abietic acid as deposited in a centrifuge basket from crystallized tall oil was sprayed in the spinning basket with 0.5% warm (120° F.) sodium carbonate solution using about 50 gallons during 5 minutes. The resulting crystals were then sprayed with live steam. After about 5 lbs. of steam had been blown in, the crystals were hot and only negligible amounts of condensate were formed. The cake, containing about 4% of moisture, was then dried by spinning in a current of warm air. The analysis of the thus purified material was as follows:

| | Original sample | Sample treated with Alkaline Solution and Steam Washed |
|---|---|---|
| Rosin acids | 91% | 98% |
| Color | yellow | white |
| Loss | | 18% |

It is desirable that the abietic acid crystals be well formed, both in order to minimize loss in abietic acid and to permit relatively easy passage of alkali solution and steam through the crystal mass. In lieu of sodium carbonate, other solutions in water of alkaline substances furnishing hydroxyl ions to neutralize the free liquid phase acids may be used, as for example dilute sodium or ammonium hydroxide.

We claim:

1. In the method of purifying tall oil abietic acid crystals to remove adhering mother liquor containing liquid phase fatty and rosin acids, the step which consists in bringing into intimate contact abietic acid containing fatty acids as an impurity, and a dilute water solution of an alkaline substance which does not form insoluble soaps and which furnishes hydroxyl ions to neutralize free fatty acids present in said liquid phase, separating the purified abietic acid from the attendant aqueous component and washing the abietic acid before sufficient time elapses for the crystals to dissolve in substantial amounts.

2. The method of purifying abietic acid crystals having adhering thereto mother liquor consisting predominantly of fatty acids, which consists in treating the crystals with an aqueous solution of an alkali metal carbonate to neutralize fatty acids present in said mother liquor and separating the purified abietic acid from said aqueous solution before sufficient time elapses for the crystals to dissolve in substantial amounts.

3. In the method of purifying tall oil abietic acid to remove adhering mother liquor containing fatty and rosin acids, the step which consists in bringing into intimate contact abietic acid crystals containing fatty acids as an impurity, and a dilute water solution of an alkaline substance which does not form insoluble soaps and which furnishes hydroxyl ions to neutralize free fatty acids present in said liquid phase, separating the purified abietic acid from the attendant aqueous component, washing the abietic acid, and then steaming the washed abietic acid crystals while they are subjected to centrifugal action whereby said solution is removed with the dissolved fatty acid soaps before the crystals have been dissolved to any substantial degree.

ARTHUR POLLAK.
HENRY P. JOHNSTON.

REFERENCES CITED

The following references are of record in the file of this patent:

UNITED STATES PATENTS

| Number | Name | Date |
|---|---|---|
| 2,311,386 | Hasselstrom | Feb. 16, 1943 |
| 2,378,359 | Houpt | June 12, 1945 |

FOREIGN PATENTS

| Number | Country | Date |
|---|---|---|
| 46,718 | Sweden | May 12, 1917 |